United States Patent [19]

Laurent et al.

[11] Patent Number: 4,879,121
[45] Date of Patent: * Nov. 7, 1989

[54] ZEOLITES IN POULTRY FEEDING

[75] Inventors: Sebastian M. Laurent, Greenwell Springs; Robert N. Sanders, Baton Rouge, both of La.

[73] Assignee: Ethyl Corporation, Richmond, Va.

[ * ] Notice: The portion of the term of this patent subsequent to Dec. 3, 2002 has been disclaimed.

[21] Appl. No.: 934,460

[22] Filed: Nov. 24, 1986

Related U.S. Application Data

[60] Continuation-in-part of Ser. No. 846,188, Mar. 31, 1986, abandoned, which is a continuation of Ser. No. 741,572, Jun. 5, 1985, abandoned, which is a division of Ser. No. 475,370, Mar. 14, 1983, Pat. No. 4,556,564.

[51] Int. Cl.$^4$ .............................................. A23K 1/00
[52] U.S. Cl. .......................................... 426/2; 426/72; 426/74; 426/623; 426/807
[58] Field of Search ................. 426/2, 73, 74, 72, 623, 426/630, 807

[56]     References Cited
   U.S. PATENT DOCUMENTS

| | | | |
|---|---|---|---|
| 3,577,242 | 5/1971 | Jenevein | 426/2 |
| 3,836,676 | 9/1974 | Komakine | 426/74 |
| 4,393,082 | 7/1983 | White et al. | 426/2 |
| 4,515,780 | 5/1985 | Laurent et al. | 424/154 |
| 4,556,564 | 12/1985 | Laurent et al. | 426/2 |
| 4,610,882 | 9/1986 | Laurent et al. | 426/2 |
| 4,610,883 | 9/1986 | Laurent et al. | 426/2 |
| 4,665,099 | 5/1987 | Ramallo et al. | 426/2 |
| 4,673,576 | 6/1987 | D'Aiello | 426/2 |

FOREIGN PATENT DOCUMENTS

| | | |
|---|---|---|
| 939186 | 1/1974 | Canada . |
| 0224856 | 6/1987 | European Pat. Off. . |
| 59-203450 | 11/1984 | Japan . |

OTHER PUBLICATIONS

Vest et al, "Influence of Feeding Zeolites to Poultry Underfield Conditions", Extension Poultry Science Dept. Univ. of Georgia.
Willis et al, Evaluation of Zeolites Fed to Male Broiler Chickens, Poultry Science, vol. 61, Mar. 1982, pp. 438–442.
Ethyl Corporation Brochure, Which Can We Improve... The Chicken or the Egg?, Jan. 1986 version.
Ethyl Corporation Brochure, Which Can We Improve... The Chicken or the Egg?, Revised version subsequent to Dec. 30, 1986.
Mumpton et al, The Appln. of Natural Zeolites in Animal Sci. & Aquaculture, Journal of Animal Science, 45, No. 5, 1188–1203 (1977).
Chung et al, Nongsa Sihom Youngu Pogo, 1978, 20 (Livestock), pp. 77–83.
Nakaue, Poultry Science, 60, 944–949 (1981).
Reagan, Luther M., Effects of Adding Zeolites to the Diets of Broiler Cockerels; Thesis Recommended for Acceptance 4/25/84; Colorado State University.
Nolen et al, Food & Cosmetic Toxicology, 21, (5), p. 697 (1983).
Carlisle, Nutrition Reviews, 40 (7), pp. 193–198 (1982).
Carlisle, Chap. Four of Silicon & Siliceous Structures in Biol. Systems, Simpson, T. L., ed. B. E. Springer Verlag, NY (1981), pp. 69–94.
Edwards, Poultry Science, vol. 65, Supp. No. 1 (1986).
Roland et al, Poultry Science, 64, 1177–87 (1985).
Miles et al, Nutrition Reports International, 34, No. 6, 1097 (Dec. 1986).
Ingram et al, Influence of ETHACAL ® Feed Component on Production Parameters of White Leghorn Hens During High Temperatures.
Hatieganu et al, Buletinul Institutului Agronomic Cluj-Napoca, Zootehnie si Medicina 33, 27–34 (1979).

Primary Examiner—R. B. Penland
Attorney, Agent, or Firm—Donald L. Johnson; John F. Sieberth; Paul H. Leonard

[57]     ABSTRACT

A method of improving the lean/fat ratio in broiler poultry by adding a small effective amount of zeolite A up to about four weight percent of the feed, to the feed of the broiler poultry, and regularly feeding the broiler poultry the feed containing the zeolite A.

20 Claims, No Drawings

ZEOLITES IN POULTRY FEEDING

CROSS-REFERENCE TO RELATED APPLICATIONS

This Application is a continuation-in-part of application Ser. No. 846,188 filed on Mar. 31, 1986, and now abandoned, which is a continuation of application Ser. No. 741,572 filed on June 5, 1985, now abandoned, which in turn is a division of application Ser. No. 475,370 filed on Mar. 14, 1983, now U.S. Pat. No. 4,556,564.

BACKGROUND OF THE INVENTION

The present invention is in the general field of poultry farming and relates to the feeding of poultry and particularly to the feeding of broilers for improving the lean/fat ratio.

The demand for poultry has expanded considerably over the last decade. The poultry industry has grown from a home industry to a large scale manufacturing industry in which tens of thousands of chickens, turkeys and other birds are fed daily at single farms or poultry installations. Broilers are produced primarily for eating or human consumption.

With fat becoming less and less important in the diet of man, it is important that meat be produced which has a high lean to fat ratio.

It is therefore an important object of the present invention to provide a means for increasing or improving the lean/fat ratio in poultry meat, especially broiler meat, without increasing production costs and without having any deleterious effect on the food value or quality of the poultry meat.

In addition to increasing eggshell strength in laying hens as described in our U.S. Pat. No. 4,556,564, improving feed utilization efficiency in poultry and larger egg size as described in our U.S. Pat. No. 4,610,882, decreasing the mortality rate of poultry as described in our U.S. Pat. No. 4,610,883, and increasing the bone strength of animals, including humans, as set forth in our copending U.S. application Ser. No. 801,596, as a result of our continuing studies it has been discovered that the regular feeding of small amounts of zeolite A to poultry produces the following positive results:
1. Calmer birds, reduced activity (layers)
2. Extended lay cycle duration (layers and broiler breeders)
3. Reduced condemnation (broilers)
4. Improved feathering (broilers)

The advantages of larger eggs, extended lay cycles and reduced condemnations are self-evident. Calmer birds produce more, less deformed eggs and lay with greater regularity. Stress in layers, as with most animals is a highly negative factor. Improved feathering correlates with healthier and stronger birds.

More recently, our studies have discovered the following positive results:
1. Improved lean/fat ratio in the edible carcass
2. Improved resistance to heat stress, a multi-faceted benefit With the increased desirability of less fat in a human diet, it has become more and more important that the meat of poultry raised for food have a high lean content and a low fat content.

An article by C. Y. Chung et al from Nongsa Sihom Youngu Pogo 1978, 20 (Livestock) pp. 77-83 discusses the effects of cation exchange capacity and particle size of zeolites on the growth, feed efficiency and feed materials utilizability of broilers or broiling size chickens. Supplementing the feed of the broilers with naturally occurring zeolites, such as clinoptilolite, some increase in body weight gain was determined. Chung et al also reported that earlier results at the Livestock Experiment Station (1974, 1975, 1976—Suweon, Korea) showed that no significant difference Was observed when 1.5, 3, and 4.5 percent zeolite was added to chicken layer diets.

U.S. Pat. No. 3,836,676 issued to Chukei Komakine in 1974 discloses the use of zeolites as an absorbent for adhesion moisture of ferrous sulfate crystals in an odorless chicken feed comprising such crystals and chicken droppings. The results were said to be no less than those in the case where chickens were raised with ordinary feed.

Experiments have been in progress in Japan since 1965 on the use of natural zeolite minerals as dietary supplements for poultry, swine and cattle. Significant increases in body weight per unit of feed consumed and in the general health of the animals was reported (Minato, Hideo, Koatsugasu 5:536, 1968). Reductions in malodor were also noted.

Using clinoptilolite and mordenite from northern Japan, Onagi, T. (Rept. Yamagata Stock Raising Inst. 7, 1966) found that Leghorn chicken required less food and water and gained as much weight in a two-week trial as birds receiving a control diet. No adverse effects on health or mortality were noted. The foregoing Japanese experiments were reported by F. A. Mumpton and P. H. Fishman in the *Journal of Animal Science,* Vol. 45, No. 5 (1977) pp. 1188-1203.

Canadian Patent No. 939,186 issued to White et al in 1974 discloses the use of zeolites having exchangeable cations as a feed component in the feeding of urea or biuret non-protein (NPR) compounds to ruminants, such as cattle, sheep and goats. Natural and synthetic as well as crystalline and non-crystalline zeolites are disclosed. Zeolites tested included natural zeolites, chabazite and clinoptilolite and synthetic zeolites X, Y, F, J, M, Z, and A. Zeolite F was by far the most outstanding and zeolite A was substantially ineffective.

In a recent study at the University of Georgia, both broilers and layers were fed small amounts (about 2%) of clinoptilolite, a naturally occurring zeolite from Tilden, Tex. An article written by Larry Vest and John Shutze entitled "The Influence of Feeding Zeolites to Poultry Under Field conditions" summarizing the studies was presented at Zeo-Agriculture '82.

A study by H. S. Nakaue of feeding White Leghorn layers clinoptilolite, reported in 1981 Poultry Science 60:944-949, disclosed no significant differences in eggshell strength between hens receiving the natural zeolite and hens not receiving the natural zeolite.

In general zeolites are crystalline, hydrated aluminosilicates of alkali and alkaline earth cations, having infinite, three-dimensional structures. There are a wide variety of types. Some types are naturally occurring and some of these types are made synthetically. Other types are made only synthetically.

Zeolites consist basically of a three-dimensional framework of $SiO_4$ and $AlO_4$ tetrahedra. The tetrahedra are crosslinked by the sharing of oxygen atoms so that the ratio of oxygen atoms to the total of the aluminum and silicon atoms is equal to two or $O/(Al+Si)=2$. The electrovalence of each tetrahedra containing aluminum is balanced by the inclusion in the crystal of a cation, for example, a sodium ion. This balance may be expressed by the formula Al/Na=1. The spaces between the tetrahedra are occupied by water molecules prior to dehydration.

Zeolite A, which is not found in nature and is made synthetically, may be distinguished from other zeolites and silicates on the basis of composition, X-ray powder diffraction patterns, and certain physical characteristics. The X-ray patterns for these zeolites are described below. Composition and density are among the characteristics which have been found to be important in identifying these zeolites.

The basic formula for all crystalline sodium zeolites may be represented as follows:

$Na_2O \cdot Al_2O_3 \cdot xSiO_2 \cdot yH_2O$

In general, a particular crystalline zeolite will have values for "x" and "y" that fall in a definite range. The value "x" for a particular zeolite will vary somewhat since the aluminum atoms and the silicon atoms occupy essentially equivalent positions in the lattice. Minor variations in the relative number of these atoms do not significantly alter the crystal structure or physical properties of the zeolite. For zeolite A, the "x" value normally falls within the range $1.85 \pm 0.5$.

The value for "y" is not necessarily an invariant for all samples of zeolites. This is true because various exchangeable ions are of different size, and, since there is no major change in the crystal lattice dimensions upon ion exchange, the space available in the pores of the zeolite to accommodate water molecules varies.

The average value for "y" for zeolite A is 5.1. The formula for zeolite A may be written as follows:

$1.0 \pm 0.2\, Na_2O \cdot Al_2O_3 \cdot 1.85 \pm 0.5 SiO_2 \cdot yH_2O$

In the formula, "y" may be any value up to 6.

An ideal zeolite A has the following formula:

$(NaAlSiO_4)_{12} 27H_2O$

Among the ways of identifying zeolites and distinguishing them from other zeolites and other crystalline substances, the X-ray powder diffraction pattern has been found to be a useful tool. In obtaining the X-ray powder diffraction patterns, standard techniques are employed. The radiation is the $K\alpha$ doublet of copper and a Geiger counter spectrometer or suitable radiation detector with a strip chart pen recorder is used. The peak heights, I, and the positions as a function of $2\theta$ where $\theta$ is the Bragg angle, are read from a spectrometer chart or accumulated in computer memory. From these, the relative intensities, $100\, I/I_o$, where $I_o$ is the intensity of the strongest line or peak and d the interplanar spacing in angstroms corresponding to the recorded lines are calculated.

X-ray powder diffraction data for a sodium zeolite A are given in Table I.

TABLE I

| X-RAY DIFFRACTION PATTERN FOR ZEOLITE A | | |
|---|---|---|
| $h^2 + k^2 + l^2$ | d (Å) | $\frac{100\, I}{I_o}$ |
| 1 | 12.29 | 100 |
| 2 | 8.71 | 70 |
| 3 | 7.11 | 35 |
| 4 | 6.15 | 2 |

TABLE I-continued

| X-RAY DIFFRACTION PATTERN FOR ZEOLITE A | | |
|---|---|---|
| $h^2 + k^2 + l^2$ | d (Å) | $\frac{100\, I}{I_o}$ |
| 5 | 5.51 | 25 |
| 6 | 5.03 | 2 |
| 8 | 4.36 | 6 |
| 9 | 4.107 | 35 |
| 10 | 3.895 | 2 |
| 11 | 3.714 | 50 |
| 13 | 3.417 | 16 |
| 14 | 3.293 | 45 |
| 16 | 3.078 | 2 |
| 17 | 2.987 | 55 |
| 18 | 2.904 | 10 |
| 20 | 2.754 | 12 |
| 21 | 2.688 | 4 |
| 22 | 2.626 | 20 |
| 24 | 2.515 | 6 |
| 25 | 2.464 | 4 |
| 26 | 2.414 | >1 |
| 27 | 2.371 | 3 |
| 29 | 2.289 | 1 |
| 30 | 2.249 | 3 |
| 32 | 2.177 | 7 |
| 33 | 2.144 | 10 |
| 34 | 2.113 | 3 |
| 35 | 2.083 | 4 |
| 36 | 2.053 | 9 |
| 41 | 1.924 | 7 |
| 42 | 1.901 | 4 |
| 44 | 2.858 | 2 |
| 45 | 1.837 | 3 |
| 49 | 1.759 | 2 |
| 50 | 1.743 | 13 |
| 53 | 1.692 | 6 |
| 54 | 1.676 | 2 |
| 55 | 1.661 | 2 |
| 57 | 1.632 | 4 |
| 59 | 1.604 | 6 |

The most significant d values for zeolite A are given in Table II.

TABLE II

| MOST SIGNIFICANT d VALUES FOR ZEOLITE A |
|---|
| d Value of Reflection in Å |
| $12.2 \pm 0.2$ |
| $8.7 \pm 0.2$ |
| $7.10 \pm 0.15$ |
| $5.50 \pm 0.10$ |
| $4.10 \pm 0.10$ |
| $3.70 \pm 0.07$ |
| $3.40 \pm 0.06$ |
| $3.29 \pm 0.05$ |
| $2.98 \pm 0.05$ |
| $2.62 \pm 0.05$ |

Occasionally, additional lines not belonging to the pattern for the zeolite appear in a pattern along with the X-ray lines characteristic of that zeolite. This is an indication that one or more additional crystalline materials are mixed with the zeolite in the sample being tested. Small changes in line positions may also occur under these conditions. Such changes in no way hinder the identification of the X-ray patterns as belonging to the zeolite.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the lattice for a zeolite, are not to exclude those materials which, due to some variable mentioned or otherwise known to those skilled in the art, fail to show all of the lines, or show a few extra ones that are permissible in the cubic system of that zeolite, or show a slight shift in position of the lines, so as to give a slightly larger or smaller lattice parameter.

A simpler test described in "American Mineralogist," Vol. 28, page 545, 1943, permits a quick check of the silicon to aluminum ratio of the zeolite. According to the description of the test, zeolite minerals with a three-dimensional network that contains aluminum and silicon atoms in an atomic ratio of $Al/Si = \frac{2}{3} = 0.67$, or greater, produce a gel when treated with hydrochloric acid. Zeolites having smaller aluminum to silicon ratios disintegrate in the presence of hydrochloric acid and precipitate silica. These tests were developed with natural zeolites and may vary slightly when applied to synthetic types.

U. S. Pat. No. 2,882,243 describes a process for making zeolite A comprising preparing a sodium-aluminum-silicate water mixture having an $SiO_2:Al_2O_3$ mole ratio of from 0.5:1 to 1.5:1, and $Na_2O/SiO_2$ mole ratio of from 0.8:1 to 3:1, and an $H_2O/Na_2O$ mole ratio of from 35:1 to 200:1, maintaining the mixture at a temperature of from 20° C. to 175° C. until zeolite A is formed, and separating the zeolite A from the mother liquor.

It is therefore an important object of the present invention to provide an improved feed formulation for broilers which contains a small amount of zeolite A.

It is a principal object of the invention to provide a broiler feed containing zeolite A which improves the lean/fat ratio of the broilers without causing a deleterious effect on the broilers.

Still another object of the invention is to cost effectively increase broiler production.

Other objects and advantages of the invention will be more fully understood from a reading of the description and claims hereinafter.

SUMMARY OF THE INVENTION

The present invention relates to a method of improving the lean/fat ratio of broiler poultry without deleterious effects on the poultry or poultry meat wherein a small amount of zeolite A up to about four weight percent of feed is added to the feed of the broiler poultry and the feed containing the zeolite A is regularly fed to the broiler poultry.

DESCRIPTION OF THE PREFERRED EMBODIMENT

It has been discovered that the addition of a relatively small amount of zeolite A to a regular or standard feed for broiling poultry, especially broiler chickens, effectively improves the lean/fat ratio of the broiler poultry with no significant changes in feed consumption. Zeolite A is preferably added in amounts of from about 0.25 percent to about 4.00 percent, and more preferably less than about 3.5 percent by weight of the total feed.

Broilers are normally fed several different rations during their growth period.

A typical feed preparation for large scale broiler poultry operations broadly comprises the following by weight percent:

| | |
|---|---|
| Corn | 55–75 |
| Soy Bean Meal | 16–30 |
| Limestone | 0.5–1.0 |
| Phosphates | 0.6–2.0 |
| Fat | 2.0–7.0 |
| Vitamins, Amino Acids | 0.5–1.0 |
| Salt and Other Minerals | |

A typical feeding scheme for broiler poultry includes a starter ration, a grower ration, a finisher ration and a withdrawal ration. These rations will vary in composition to match or otherwise agree with the poultry's nutritional requirements as the poultry grow to maturity. The withdrawal ration is free of antibiotics and the like so as not to leave any undesirable residue in the final meat product.

Zeolite A is added to each of such feed formulations or rations in small amounts by weight percent of up to about four weight percent with less than 3.5 weight percent being preferred. Greater amounts may be used, but may deprive the broiler poultry of the desired amount of nutrients. Greater amounts are also likely to be cost ineffective. A preferred amount of zeolite A is from about one-half to about two percent by weight of the total feed formulation. A most preferred amount of zeolite A is about 0.25 to about 1.00 weight percent of the total fee formulation.

Using ETHACAL TM feed component, a commercially available sodium zeolite A, a number of tests were conducted to determine the effect of zeolites on the lean/fat ratio in broiler poultry. ETHACAL TM feed component has the following typical characteristics:

| | |
|---|---|
| Form | Free flowing powder |
| Color | White |
| Bulk Density, lb/ft$^3$ | 23–29 |
| Mean Particle Size, microns | 3.0 |
| Theoretical Ion Exchange Capacity, milliequivalents per gram (anhydrous) | 7.0 |

A typical chemical analysis is as follows:

| ELEMENT | % |
|---|---|
| Sodium (Na) | 12.6 |
| Alumininum (Al) | 14.8 |
| Silicon (Si) | 15.3 |
| Oxygen (O) | 35.1 |
| Water of hydration (H$_2$O) | 22.2 |
| Heavy Metals (Food Chemicals Codex Method) | less than 10 PPM |
| Lead (Food Chemicals Codes Method) | less than 10 PPM |

The diet fed to the broilers consisted principally of corn supplemented with a soybean meal (SBM) and limestone. Smaller amounts of fish meal, dicalcium phosphate (DiCalP), a synthetic amino acid (DL-methionine), salt, a commercial vitamin and mineral supplement for broilers (Micro-Mix) were also added. Each diet assured that the broilers received all of the required nutrients and minerals recommended by the Subcommittee on Poultry Nutrition of the U.S. National Research Council.

Female broilers have a much higher tendency than males toward excess fat deposits in their carcasses. It is therefore of utmost importance that fat be reduced, since females comprise about 50 percent of the broiler meat consumed in the U.S. Analysis of very low density lipoproteins (VLDL) in the blood correlates with the lean/fat ratio of the carcass in broiler chickens Studies of zeolite A diets compared with controls, i.e. similar diets not containing zeolite A, are shown in the following table:

| Weight Percent Zeolite A in Diet | Average Parts per Million VLDL in Blood | |
|---|---|---|
| | Males | Females |
| 0 | 24.1 | 25.4 |
| 0.25 | 25.1 | 25.7 |
| 0.50 | 24.5 | 24.8 |

It can readily be seen that in female broilers, where fat is deposited more quantitatively the higher level of zeolite A in the diet results in lower VLDL levels in the blood. Higher levels of zeolite A in broiler diets (1.0 weight percent) have been shown to give better performance in weight gain and feed efficiency and should be expected to give added benefit with the lean/fat parameter also.

The term poultry includes all domestic fowl, namely chickens, turkeys, ducks, geese, and the like.

It can be appreciated that a wide variety of nutrients or foods may be included in the diets of broiler poultry. In a controlled environment, the poultry are only exposed to desired foods or food products. A typical ration program for broiler poultry contains the following:

| Starter Diet - Fed to Broilers 0-21 Days of Age | |
|---|---|
| | Weight Percent |
| Crude Protein | 21.22 |
| Calcium | 0.86 |
| Available Phosphorus | 0.45 |
| Synthetic Lysine | 1.18 |
| Methionine and Cystine | 0.87 |
| Sodium | 0.20 |
| Potassium | 0.82 |
| Chloride | 0.31 |
| Metabolizable Energy in K cal/lb | 1440 |

| Grower Diet - Fed to Broilers 21-43 Days of Age | |
|---|---|
| | Weight Percent |
| Crude Protein | 19.27 |
| Calcium | 0.80 |
| Available Phosphorus | 0.41 |
| Synthetic Lysine | 1.04 |
| Methionine and Cystine | 0.82 |
| Sodium | 0.20 |
| Potassium | 0.74 |
| Chloride | 0.31 |
| Metabolizable Energy in K cal/lb | 1460 |

| Withdrawal Diet - Fed to Broilers 43-50 Days of Age | |
|---|---|
| | Weight Percent |
| Crude Protein | 16.85 |
| Calcium | 0.60 |
| Available Phosphorus | 0.32 |
| Synthetic Lysine | 0.86 |
| Methionine and Cystine | 0.72 |
| Sodium | 0.20 |
| Potassium | 0.63 |
| Chloride | 0.32 |
| Metabolizable Energy in K cal/lb | 1480 |

The foregoing compositions are obtained from or include many of the following ingredients:

Grain and processed grain by-products. Includes corn, corn hominy, corn germ meal, barley, millet, oats, rice, rice hulls, rye, sorghum, wheat and wheat shorts. These are among the energy ingredients, mostly carbohydrates with some proteins.

Plant protein products. Includes soybean oil meal, barley malt sprouts, coconut meal, corn distillers grain, corn gluten meal, cottonseed meal, pea seed, potato meal, peanut meal, rape seed meal, sunflower meal, wheat germ meal, brewers' yeast. All of these are protein sources.

Roughage or fiber. Includes dehydrated alfalfa, alfalfa hay, alfalfa leaf meal and pasture grasses. These are all fiber sources.

Animal and fish by-products. Includes blood meal, blood flour, dried buttermilk, dried whey, dried casein, fish meal, dried fish solubles, liver meal, meat meal, meat meal tankage, bone meal and dried skim milk. Anchovies, herring and menhaden are sources of fish meal.

Minerals and synthetic trace ingredients. Includes vitamins such as B-12, A, pantothenate, niacin, riboflavin, K, etc., DL-methionine, choline chloride, folic acid, dicalcium phosphate, magnesium sulfonate, potassium sulfate, calcium carbonate (limestone, oyster shells), salt sodium selenite, manganous oxide, calcium iodate, copper oxide, zinc oxide and D activated animal sterol.

Molasses and animal fats are added to improve palatability and to increase or balance the energy levels.

Preservatives are also added such as, Ethoxyquin and sodium sulfite.

In general, a feed composition for broilers or broiler poultry should preferably contain by weight percent the following:

| | | Weight Percent |
|---|---|---|
| crude protein | at least about | 14 |
| crude fat | at least about | 2 |
| crude fiber | not more than about | 7 |
| calcium | about | 0.5 to 1.0 |
| phosphorous | at least about | 0.2 |
| iodine | at least | 0.0001 |
| sodium | about | 0.1 to 0.4 |
| chlorine | about | 0.1 to 0.5 |
| zeolite A | about | 0.25 to 4.0 |

The foregoing disclosure and description of the invention is illustrative and explanatory thereof and various changes in the illustrated process may be made within the scope of the appended claims without departing from the spirit of the invention.

What is claimed is:

1. A method of improving the lean/fat ration of broiler poultry as correlated with the very low density lipoproteins in the blood of said poultry, said method comprising feeding said poultry an amount of zeolite A sufficient to improve said ratio, said zeolite A being incorporated in an amount of up to about 4 weight percent in poultry feed.

2. The method of claim 1, wherein the amount of zeolite A added to the feed composition is from about 0.25 percent to 3.5 weight percent.

3. The amount of claim 1, wherein said zeolite A in said feed composition is in an amount of about 0.25 to about 1.5 weight percent.

4. The method of claim 1, wherein the amount of zeolite A added to the feed composition is about 0.50 weight percent.

5. The method of claim 1, wherein the amount of zeolite A added to the feed composition is about 1.0 weight percent.

6. The method of claim 1, wherein the feed composition contains zeolite A in an amount of about 0.25 to about 3.5 weight percent.

7. The method of claim 1, wherein the feed composition comprises proteins, fats, carbohydrates, minerals and vitamins.

8. The method of claim 1, wherein the feed composition comprises by weight percent the following:

| | |
|---|---|
| crude protein | at least about 14 |
| crude fat | at least about 2 |
| crude fiber | not more than about 7.0 |
| calcium | about 0.5 to 1.0 |
| phosphorus | at least about 0.2 |
| iodine | at least about 0.0001 |
| sodium | about 0.1 to 0.4 |
| chloride | about 0.1 to 0.5 |
| zeolite A | about 0.25 to 4.0 |

9. The method of claim 1, wherein the feed composition comprises by weight percent the following:

| | |
|---|---|
| crude protein | at least about 16 |
| crude fat | at least about 2.5 |
| crude fiber | not more than about 7.0 |
| calcium | at least about 0.5 |
| phosphorus | at least about 0.2 |
| iodine | at least about 0.0001 |
| sodium | about 0.2 |
| chloride | about 0.3 |
| zeolite A | about 0.25 to 4.00 |

10. The method of claim 1, wherein the broiler poultry are chickens.

11. The method of claim 1, wherein the poultry are turkeys.

12. The method of claim 1, wherein the broiler poultry are chickens and the lean/fat ratio of the chickens is increased over that of similar chickens fed a similar feed composition not containing zeolite A.

13. A method of improving the lean/fat ratio in broiler poultry as correlated with the very low density lipoproteins in the blood of said poultry, wherein a feed composition comprising principally corn, and about 0.25 to about 4.00 percent by weight of zeolite A is fed to the broiler poultry.

14. The method of claim 13, wherein the feed composition contains zeolite A in an amount of about 0.25 to about 3.5 weight percent.

15. The method of claim 13, wherein the feed composition contains zeolite A in an amount of about 0.25 to about 1.5 weight percent.

16. The method of claim 13, wherein the broiler poultry are chickens.

17. A method of improving the lean/fat ratio in broiler poultry as correlated with the very low density lipoproteins in the blood of said poultry, wherein a feed composition comprising by weight percent, 50-75 percent corn, 10-30 percent soybean meat, and 1-6 percent calcium carbonate, and about 0.25 percent to about 4.0 percent by weight of zeolite A is regularly fed to the broiler poultry.

18. The method of claim 17, wherein the feed composition contains zeolite A in an amount of about 0.25 to about 3.5 weight percent.

19. The method of claim 17, wherein the feed composition contains zeolite A in an amount of about 0.25 to about 1.5 weight percent.

20. The method of claim 17, wherein the broiler poultry are chickens.

* * * * *